(12) United States Patent
Wacker

(10) Patent No.: US 6,996,999 B2
(45) Date of Patent: Feb. 14, 2006

(54) METHOD AND APPARATUS FOR CONTROLLING HUMIDITY WITH AN AIR CONDITIONER

(75) Inventor: Paul C. Wacker, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 10 days.

(21) Appl. No.: 10/626,929

(22) Filed: Jul. 25, 2003

(65) Prior Publication Data

US 2005/0016189 A1 Jan. 27, 2005

(51) Int. Cl.
*G05D 21/00* (2006.01)
(52) U.S. Cl. .................. 62/158; 62/176.6; 236/44 C; 165/225; 165/269
(58) Field of Classification Search .............. 62/157, 62/158, 231, 176.1, 176.6; 165/222, 223, 165/224, 225, 267, 268, 269, 270; 236/44 R, 236/44 C, 46 R, 46 F
See application file for complete search history.

(56) References Cited

U.S. PATENT DOCUMENTS

| 4,105,063 | A |   | 8/1978  | Bergt |   |
|---|---|---|---|---|---|
| 4,540,040 | A | * | 9/1985  | Fukumoto et al. | .......... 165/202 |
| 4,889,280 | A |   | 12/1989 | Grald et al. |   |
| 5,192,020 | A |   | 3/1993  | Shah |   |
| 5,326,026 | A |   | 7/1994  | Jefferson et al. |   |
| 5,346,129 | A |   | 9/1994  | Shah et al. |   |
| 5,427,175 | A |   | 6/1995  | Nagasawa |   |
| 5,544,809 | A |   | 8/1996  | Keating et al. |   |
| 5,911,747 | A | * | 6/1999  | Gauthier | .................... 62/176.6 |
| 5,915,473 | A |   | 6/1999  | Ganesh et al. |   |
| 6,070,110 | A |   | 5/2000  | Shah et al. |   |
| 6,079,121 | A |   | 6/2000  | Khadkikar et al. |   |
| 6,427,454 | B1 | * | 8/2002  | West | .............................. 62/93 |
| 6,478,084 | B1 |   | 11/2002 | Kumar et al. |   |
| 6,826,920 | B1 | * | 12/2004 | Wacker | .................... 62/176.6 |

OTHER PUBLICATIONS

"Heat Calculations Made Using the Models 8386 and 8386A VelociCalc Plus," Application Note, TSI Incorporated, 1998.

* cited by examiner

*Primary Examiner*—Harry B. Tanner
(74) *Attorney, Agent, or Firm*—Greogory M. Ansems

(57) ABSTRACT

Methods and apparatus for more effectively managing humidity of an inside space using an air conditioner are provided. In one illustrative embodiment, the system determines whether the humidity level in an inside space is above a predetermined humidity threshold, and if so, changes a control parameter such as a minimum "on" time for the air conditioner. If the humidity level in the inside space is not above the predetermined humidity threshold, the control parameter is not changed, or changed less than when the humidity level is above the predetermined humidity threshold. Rather than changing (i.e. increasing) the minimum "on" time, it is contemplated that any control parameter that increases the "on" time of the air conditioner may be used including, for example, changing (i.e. decreasing) the maximum cycle rate allowed for the air conditioner.

27 Claims, 4 Drawing Sheets

METHOD AND APPARATUS FOR CONTROLLING HUMIDITY WITH AN AIR CONDITIONER

FIELD

The present invention is related to the field of heating, ventilation and air conditioning (HVAC), and more particularly, to methods and apparatus for controlling humidity in an inside space with an air conditioner.

BACKGROUND

The level of comfort in an inside space is related to both temperature and humidity. While temperature control has long been a primary focus of many HVAC systems, humidity control is becoming ever more important. When an air conditioner is operating at steady state, air flowing past the air conditioner coils generally results in condensation on the coils, thus removing water from the air and reducing the humidity of the inside space.

However, when many air conditioners are first activated, and for a time period thereafter, the temperature of the air conditioner coils is above the dew point temperature of the air. That is, the air conditioner coils have not yet had time to cool to a temperature that is below the dew point temperature of the air in the inside space. Accordingly, when the air conditioner is first activated, and for a time period thereafter, little or no latent cooling (i.e. moisture removal) occurs. Rather, the air conditioner must remain "on" for a period of time before the temperature of the air conditioner coils can drop below the dew point temperature of the air, and begin removing water from the air.

This is particularly problematic when the cooling capacity of the air conditioner is large relative to the cooling demands of the inside space. In some cases, the air conditioner is simply oversized for the size of the inside space, and in other cases, the environmental conditions only present a limited heat load to the air conditioner. In either case, the air conditioner typically may satisfy a call for cooling in a relatively short time period, which may result in relatively short duty cycles. To prevent very short duty cycles, which could damage the air conditioner, many manufacturers specify a minimum "on" time for their air conditioning units. However, because the minimum "on" time is specified for a different purpose (e.g. to prevent damage), the minimum "on" time requirement is typically too short (e.g. 3 minutes or less) to allow for any significant water removal during this period. For these and other reasons, it has been found that existing control algorithms that attempt to moderate or reduce humidity using an air conditioner, particularly when the air conditioner is under low or moderate load conditions, are not very effective.

SUMMARY

The present invention provides methods and apparatus for more effectively managing humidity of an inside space using an air conditioner. In one illustrative embodiment, the system determines whether the humidity level in the inside space is above a predetermined humidity threshold, and if so, changes a control parameter such as the minimum "on" time for the air conditioner. If the humidity level in the inside space is not above the predetermined humidity threshold, the control parameter may not be changed, or changed less than when the humidity level is above the predetermined humidity threshold. Rather than changing (i.e. increasing) the minimum "on" time of the air conditioner, it is contemplated that any control parameter that increases the running time of the air conditioner may be used including, for example, changing (i.e. decreasing) the maximum cycle rate of the air conditioner.

It is contemplated that the amount that the control parameter is changed may be determined in any number of ways. For example, the control parameter may be changed by a predetermined fixed amount. In another example, the control parameter may be changed by an amount that is based on knowledge of the latent and sensible cooling characteristics of the air conditioner, and/or past, present and/or predicted future environmental conditions, as desired.

DETAILED DESCRIPTION

The following detailed description should be read with reference to the drawings. The drawings, which are not necessarily to scale, depict illustrative embodiments and are not intended to limit the scope of the invention.

Figure 1:
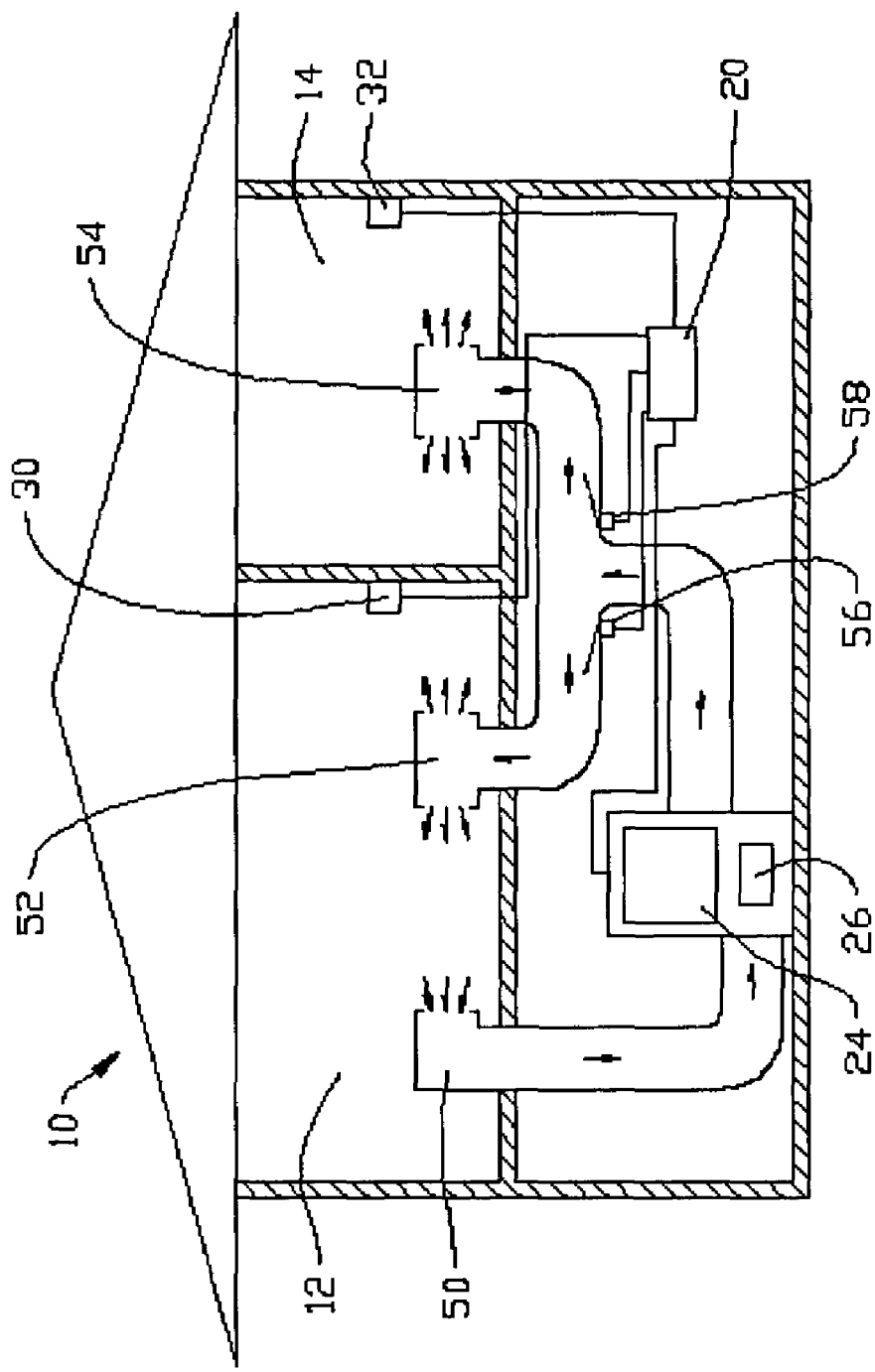
FIG. 1 shows a highly diagrammatic schematic view of an HVAC system adapted to control an inside space of a building or other structure.

FIG. 1 shows a highly diagrammatic schematic view of an HVAC system adapted to control an inside space of a building or other structure. In the illustrative embodiment, the HVAC system is used to control the temperature, humidity and/or other environmental parameters in the inside space 10, in which a first zone 12 and a second zone 14 have been defined. While a multi-zoned HVAC system is shown, it is contemplated that a single-zoned HVAC system can also be used, if desired.

The illustrative HVAC system includes a controller 20 which controls a HVAC unit 24 and a fan or blower 26. The HVAC unit 24 may include an air conditioner, which may have parts outside of the inside space 10. In some embodiments, the air conditioner has a compressor and heat exchanger outside of the inside space 10, and one or more air conditioner coils within a plenum connected to the duct work within the inside space 10. In some embodiments, the air conditioner is a constant volume rooftop unit, commonly used in some residential and commercial applications, and/ or may be single or multi-stage unit.

Preferably, the controller 20 gathers information about temperatures and humidity levels in the inside space 10 from a first thermostat/humidistat 30 in a first zone 12 and a second thermostat/humidistat 32 in a second zone 14. An air intake 50 is shown in the first zone 12, and another air intake (not shown) may be included in the second zone 14, if desired. A first vent 52 feeds air into the first zone 12, and a second vent 54 feeds air into the second zone 14. A first damper 56 controls whether air is forced through the first vent 52 into the first zone 12, and a second damper 58 controls whether air is forced through the second vent 54 into the second zone 14.

During a cooling operation, the controller 20 may sense whether either or both of the thermostats/humidistats 30 and 32 indicate a call for cooling. If there is a call for cooling, the controller 20 activates the blower 26. The controller 20 also may control the position of damper 56 and/or damper 58. For example, if thermostat/humidistat 30 indicates a call for cooling and thermostat/humidistat 32 does not, controller 20 may close damper 58 to prevent cool air from being supplied to the second zone 14, and open damper 56 to allow cool air to be supplied to the first zone 12. The controller 20 may then activate the air conditioner of the HVAC system 24. Once both thermostats/humidistats 30 and 32 indicate that the temperature in each respective zone 12 and 14 is at or below a predetermined temperature set point, the controller 20 may turn off the air conditioner, and eventually the fan or blower 26. Some HVAC systems 24 may also include a furnace for heating the inside space 10. Heating operations may be performed in a manner similar to that described above.

Figure 2:
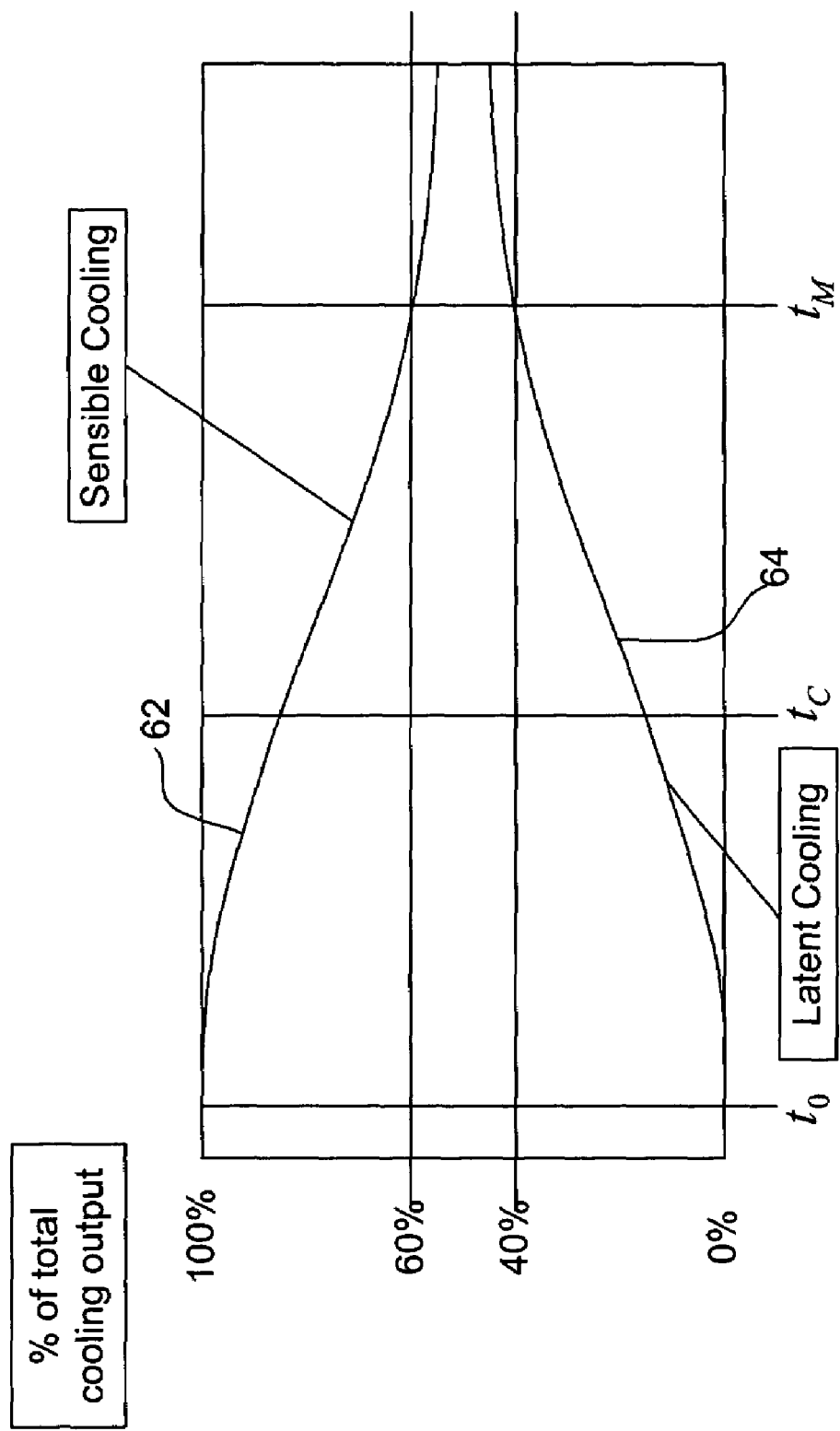
FIG. 2 is an illustrative graph showing latent and sensible cooling characteristics of a typical air conditioner.

FIG. 2 is a graph showing illustrative latent and sensible cooling characteristics of a typical air conditioner. The total heat transfer of an air conditioner is the sum of the latent heat transfer (i.e. moisture removal) and the sensible heat transfer:

$$Q_T = Q_S + Q_L \qquad \text{(Equation 1)}$$

FIG. 2 graphically illustrates a typical cooling output characteristic of an air conditioner during an air conditioning cycle. At time to, the air conditioner receives a call for cooling from the controller 20 and turns on. The sensible cooling output 62 initially makes up 100% of the cooling output of the air conditioner. As the air conditioner remains on, the latent cooling output 64 begins to provide a significant percentage of the total cooling output.

If the inside space 10 being cooled by the air conditioner 24 is small relative to the overall capacity of the air conditioner, or environmental conditions surrounding the inside space 10 cause the heat load presented to the air conditioner 24 to be relatively light, the total cooling needs of the inside space 10 may be satisfied in a relatively short time period. For example, time $t_C$ in FIG. 2 represents a turn-off time at which the cooling needs of a inside space 10 may be met by the air conditioner 24. However, because the air conditioner 24 has run for only a short period of time, the latent cooling output 64 (i.e. moisture removal) has remained relatively small, and little moisture removal has occurred. This can result in relatively high humidity in the inside space, which can cause discomfort to the occupants of the inside space 10, and over time, can encourage deterioration of carpets, furniture, drywall, etc., as well as encourage mold growth.

In one illustrative embodiment of the present invention, the humidity level in the controlled space is monitored by one or more thermostats/humidistats 30 and 32. If the humidity level in the inside space 10 (or a zone within the inside space 10) exceeds a predetermined humidity threshold level, the minimum "on" time for the air conditioner may be extended. For example, as shown in FIG. 2, an extended minimum on time $t_M$ may be selected, causing the air conditioner 24 to run until time $t_M$ rather than time $t_C$. In this illustrative embodiment, the minimum "on" time $t_M$ may be a preselected minimum "on" time number, which is stored in a memory of the controller 20. This may result in a greater amount of latent cooling (i.e. moisture removal) in the inside space 10. Because the air conditioner 24 may be left on after the temperature needs of the inside space 10 have been met, the inside space 10 may be cooled to a temperature that is below the current temperature set point. In some cases, the space can be cooled one, two, or five or more degrees below the desired temperature set point. However, deterioration and health hazards related to extended high humidity conditions in the inside space 10 may be reduced or avoided.

In another illustrative embodiment of the present invention, the minimum "on" time $t_M$ may be determined from knowledge related to the latent and sensible cooling characteristics of the air conditioner 24. For example, given a particular sensed temperature and humidity level, the air conditioner 24 may demonstrate a predictable cooling output curve over time for both latent and sensible cooling. By knowing the current temperature and/or humidity levels, the controller 20 may determine that the air conditioner 24 should run for a time $t_M$ before turning off in order to achieve a desired balance between latent and sensible cooling.

In one example, the minimum "on" time may be chosen to correspond to a desired percentage of the latent cooling capacity of the air conditioner 20. The minimum "on" time may be selected so that the air conditioner 24 can be predicted to reach 90% (or any other desired percentage) of its latent cooling capacity before turning off. The desired percentage may be any level, and 90% is chosen here merely because it may indicate that the air conditioner 24 is close to achieving steady state operation where the coolant and coils are cooled to nearly the maximum extent possible. Alternatively, the minimum "on" time of the air conditioner 24 may be selected so that the air conditioner 24 can be predicted to reach a desired ratio of sensible to latent cooling capacities, for example, a 60/40 ratio may be selected, though any ratio may be chosen.

In yet another illustrative embodiment, the air conditioner 24 may include one or more sensors, for example, on or near the air conditioner cooling coils. The one or more sensors may sense the dry bulb temperature, wet bulb temperature, dew point, condensation on the air conditioner coils, and/or any other measure of temperature or moisture, and may provide one or more signals that can be used to provide an indication of the current latent and/or sensible cooling of the air conditioner 24. By monitoring the sensor output(s), it may be determined that the desired sensible/latent cooling has been achieved. In the illustrative embodiment of FIG. 2, a 60/40 ratio has been used as the desired sensible/latent cooling ratio, and time $t_M$ merely reflects the time at which the desired ratio is reached. The air conditioner 24 may therefore run until the desired ratio is achieved, rather than running for a preselected minimum "on" time as discussed above.

As eluded to above, in some cases, the air conditioner 24 may continue to run until after the temperature set point of the inside space 10 has been satisfied. A variety of comfort and/or safety features may be used to prevent the air conditioner 24 from running for an excessive amount of time in an effort to remove humidity from the inside space 10. For example, a shut-down temperature set point may be selected. A shut-down temperature set point may be, for example, defined five degrees below the desired temperature set point for the inside space 10. For example, if the air conditioner 24 is operating to keep the temperature of the inside space 10 below a desired temperature set point of 74 degrees, but to remove excessive humidity from the inside space 10, the air conditioner 24 continues to run and drives the temperature to 69 degrees, the controller 20 may shut the air conditioner 24 off to prevent excessive cooling. Any value may be used for the shut down temperature set point, and the five degree number used above is merely illustrative. Alternatively, or in addition, a time-out time may be selected, for example, to prevent the air conditioner 24 for operating continuously for an excessive amount of time. An illustrative time-out time may be an hour, though other time periods may be chosen as desired.

Figure 3:
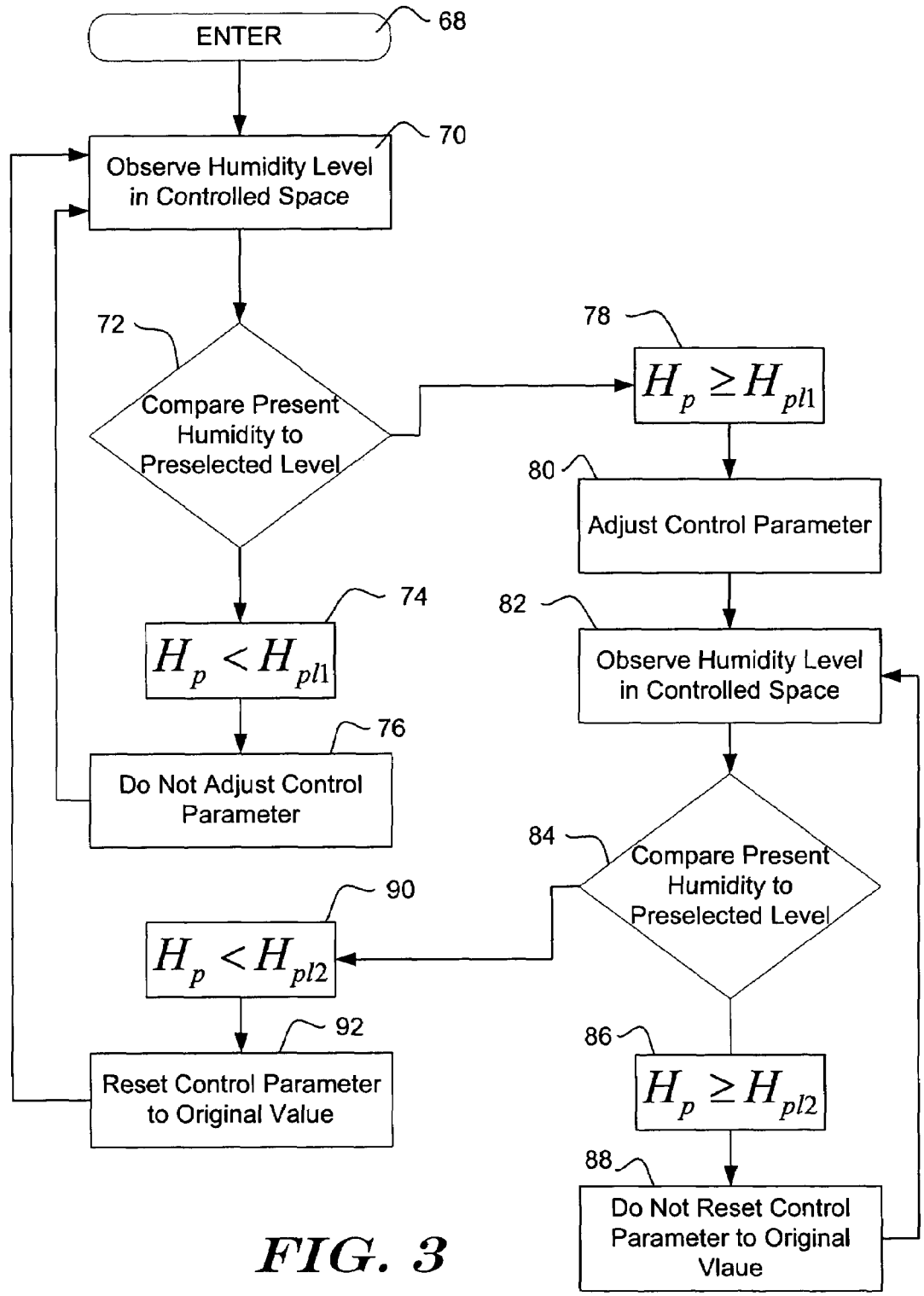
FIG. 3 is a flow chart showing an illustrative method for adjusting a control parameter (e.g. minimum "on" time) for an air conditioner.

FIG. 3 is a flow chart showing an illustrative method for adjusting a control parameter (e.g. minimum "on" time) for an air conditioner 24. The flow chart is entered at block 68, and control is passed to block 70. Block 70 observes the humidity level in the inside space 10. A decision step 72 follows, which compares the observed humidity level to a first pre-selected humidity level. If the observed humidity level ($H_p$) is less than the first pre-selected humidity level ($H_{p11}$), as shown at block 74, control is passed to block 76. Block 76 does not adjust the control parameter (e.g. minimum "on" time), and returns control to block 70. If the observed humidity level ($H_p$) is greater than or equal to the first pre-selected humidity level, as shown at block 78, control is passed to block 80. Block 80 adjusts the control parameter in an attempt to reduce the humidity level in the inside space 10.

In some illustrative embodiments, the control method may end after either adjusting the control parameter at block 80 or not adjusting the control parameter at block 76. For these embodiments, the above method may be executed each time a call for cooling is received to determine whether humidity control is desired or not. If humidity control is desired, the control parameter is adjusted (e.g. the minimum "on" time is increased) for the next air conditioning cycle. The control parameter may be reset before responding to a subsequent call for cooling.

In other illustrative embodiments, additional control steps are executed, as further illustrated in FIG. 3. For example, after the control parameter is adjusted by block 80, the humidity level may again be observed as shown at 82, preferably after a predetermined time delay. The new observed humidity level ($H_p$) may then be compared to a second pre-selected humidity level ($H_{p12}$). The second pre-selected humidity level ($H_{p12}$) may be lower than the first pre-selected level ($H_{p11}$), which helps introduce hysteresis into the system. If the new observed humidity level ($H_p$) is greater than or equal to the second pre-selected level ($H_{p12}$) 26, the control parameter is not reset to its original value as shown at block 88, and control is passed back to block 82. If, however, the new observed humidity level ($H_p$) is less than the second pre-selected level ($H_{p12}$), as shown at 90, the control parameter may be reset to its original value, as shown at 92, and control may be passed back to block 70, as shown.

As detailed above, the control parameter may help control the initiation and/or termination of an air conditioning cycle. For example, the control parameter may be a minimum "on" time, a maximum cycling rate, etc. Also, the control parameter may help control the "off" time of an air conditioning unit (rather than "on" time), or may be used to control or modify the operation of a fan in conjunction with the air conditioner 24. For example, the control parameter may be used to adjust to slow the fan or turn the fan off during an initial portion of the air conditioner cycle, allowing the air conditioner coils to cool faster to facilitate faster latent cooling through water condensation.

Figure 4:
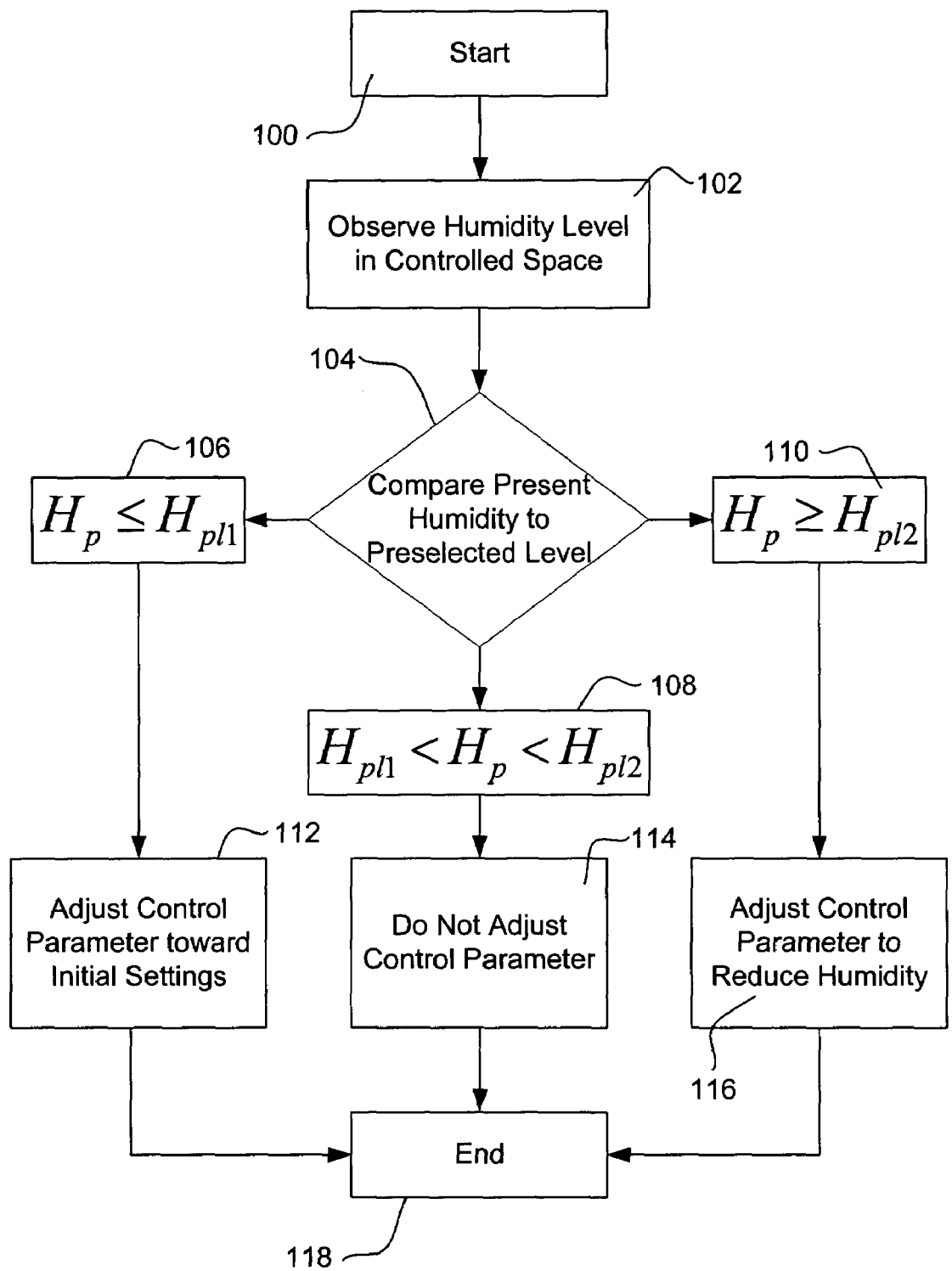
FIG. 4 is a flow chart showing another illustrative method for adjusting a control parameter (e.g. minimum "on" time) for an air conditioner.

FIG. 4 is a flow chart showing another illustrative method for adjusting a control parameter (e.g. minimum "on" time) for an air conditioner 24. The flow chart is entered at block 100, and control is passed to block 102. In block 102, the humidity level of the inside space 10 is observed, and control is passed to decision block 104. Decision block 104 compares the observed humidity level to one or more pre-selected humidity levels. In the example shown, if the observed humidity level ($H_p$) is less than or equal to a first preselected level ($H_{p11}$), as shown at block 106, control is passed to block 112 where the control parameter is adjusted towards its initial setting. If the observed humidity level ($H_p$) is between the first preselected level ($H_{p11}$) and a second preselected level ($H_{p12}$), as shown at block 108, control is passed to block 114 where the control parameter is not adjusted. Finally, if the observed humidity level ($H_p$) is greater than or equal to the second preselected level ($H_{p12}$), as shown at block 110, control is passed to block 116 where the control parameter is further adjusted in a direction or manner calculated to reduce the humidity in the inside space 10.

Those skilled in the art will recognize that the present invention may be manifested in a variety of forms other than the specific embodiments described and contemplated herein. Accordingly, departures in form and detail may be made without departing from the scope and spirit of the present invention as described in the appended claims.

What is claimed is:

1. A method for controlling an air conditioner that is adapted to service an inside space, the air conditioner having a minimum "on" time, the method comprising the steps of:
   determining if the humidity level in the inside space is above a predetermined humidity level; and
   increasing the minimum "on" time of the air conditioner if the humidity level is above the predetermined humidity level.

2. A method according to claim 1 wherein the minimum "on" time is increased by a predetermined fixed amount.

3. A method according to claim 1, wherein the air conditioner produces both latent and sensible cooling, and wherein the minimum "on" time is increased by an amount that is expected to produce a desired ratio between latent and sensible cooling of the air conditioner.

4. A method according to claim 1, wherein the air conditioner produces a maximum latent cooling during steady state conditions, and wherein the minimum "on" time is increased by an amount that is expected to produce a latent cooling that is a predetermined percentage of the maximum latent cooling of the air conditioner.

5. A method according to claim 1 wherein the minimum "on" time is increased by an amount that depends on the humidity level in the inside space.

6. A method according to claim 1 wherein the minimum "on" time is increased by an amount that depends on the humidity level as compared to one or more preselected humidity levels.

7. A method according to claim 1 further comprising the step of turning off the air conditioner if the temperature of the inside space drops below a predetermined shut-down temperature.

8. A method according to claim 1 further comprising the step of turning off the air conditioner if the air conditioner runs continuously for a predetermined time-out period.

9. A method according to claim 1, wherein the air conditioner operates in air conditioning cycles including a current air conditioning cycle to maintain the temperature in the inside space at or near a desired temperature set point.

10. A method according to claim 9, wherein the determining and the increasing steps are repeated for each air conditioner cycle.

11. A method according to claim 10 wherein the minimum "on" time is reset before the determining and increasing steps are performed for each air conditioner cycle.

12. A method according to claim 1 further comprising the step of adjusting the minimum "on" time back toward a default or initial value if the determining step determines that the humidity level in the inside space is below a predetermined humidity level.

13. A method according to claim 12 wherein the determining, increasing, and adjusting steps are repeated.

14. A method according to claim 12 wherein the determining, increasing, and adjusting steps are repeated continuously.

15. A method for controlling an air conditioner that is adapted to service an inside space, the air conditioner operating in air conditioning cycles including a current air conditioning cycle to maintain a temperature in the inside space at or near a desired temperature set point, the method comprising the steps of:

determining if the humidity level in the inside space is above a predetermined humidity level; and increasing the run time of the current air conditioning cycle if the humidity level is above the predetermined humidity level to allow increased latent cooling during the current air conditioning cycle.

16. A method according to claim 15 wherein the run time is increased by a predetermined fixed amount.

17. A method according to claim 15 wherein the air conditioner produces both latent and sensible cooling, and wherein the run time is increased by an amount that is expected to produce a desired ratio between latent and sensible cooling of the air conditioner.

18. A method according to claim 15, wherein the air conditioner produces a maximum latent cooling during steady state conditions, and wherein the run time is increased by an amount that is expected to produce a latent cooling that is a predetermined percentage of the maximum latent cooling of the air conditioner.

19. A method according to claim 15 wherein the run time is increased by an amount that depends on the humidity level in the inside space.

20. A method according to claim 15 wherein the run time is increased such that the current air conditioning cycle causes the temperature in the inside space to drop below the desired temperature set point of the inside space.

21. A method according to claim 15 wherein the run time is increased such that the current air conditioning cycle causes the temperature in the inside space to drop at least one degree below the desired temperature set point of the inside space.

22. A method according to claim 15 wherein the run time is increased such that the current air conditioning cycle causes the temperature in the inside space to drop at least two degrees below the desired temperature set point of the inside space.

23. The method of claim 15 further comprising, after extending the run time of the air conditioner, determining whether the humidity level in the space is below a lower predetermined humidity level, and, if the humidity is below the lower predetermined humidity level, reducing the run time of the air conditioner.

24. A method for controlling an air conditioner used to control characteristics of an inside space, wherein the air conditioner has predetermined latent and sensible cooling characteristics, the method comprising:

determining the humidity level in the space; and if the humidity is above a first selected humidity level, establishing a minimum on time for the air conditioner using the predetermined latent and sensible cooling characteristics.

25. The method of claim 24 wherein the minimum on time is at least longer than the amount of time, from initial turn on, that it takes for the air conditioner to reach at least 80% of its steady state latent cooling capacity.

26. The method of claim 24 wherein the minimum on time is at least longer than the amount of time, from initial turn on, that it takes for the air conditioner to reach a 60/40 ratio of sensible to latent cooling capacity.

27. A controller for an air conditioner, wherein the air conditioner is adapted to service an inside space, the air conditioner further having a minimum "on" time, the controller comprising:

means for determining if the humidity level in the inside space is above a predetermined humidity level; and means for increasing the minimum "on" time of the air conditioner if the humidity level is above the predetermined humidity level.

* * * * *